Dec. 21, 1954  S. ROSENZWEIG  2,697,571
COMBINATION VIBRATION ISOLATOR AND SNUBBER
Filed Aug. 22, 1951  2 Sheets-Sheet 1

INVENTOR
Siegfried Rosenzweig.
BY
ATTORNEY

Dec. 21, 1954  S. ROSENZWEIG  2,697,571
COMBINATION VIBRATION ISOLATOR AND SNUBBER
Filed Aug. 22, 1951  2 Sheets-Sheet 2
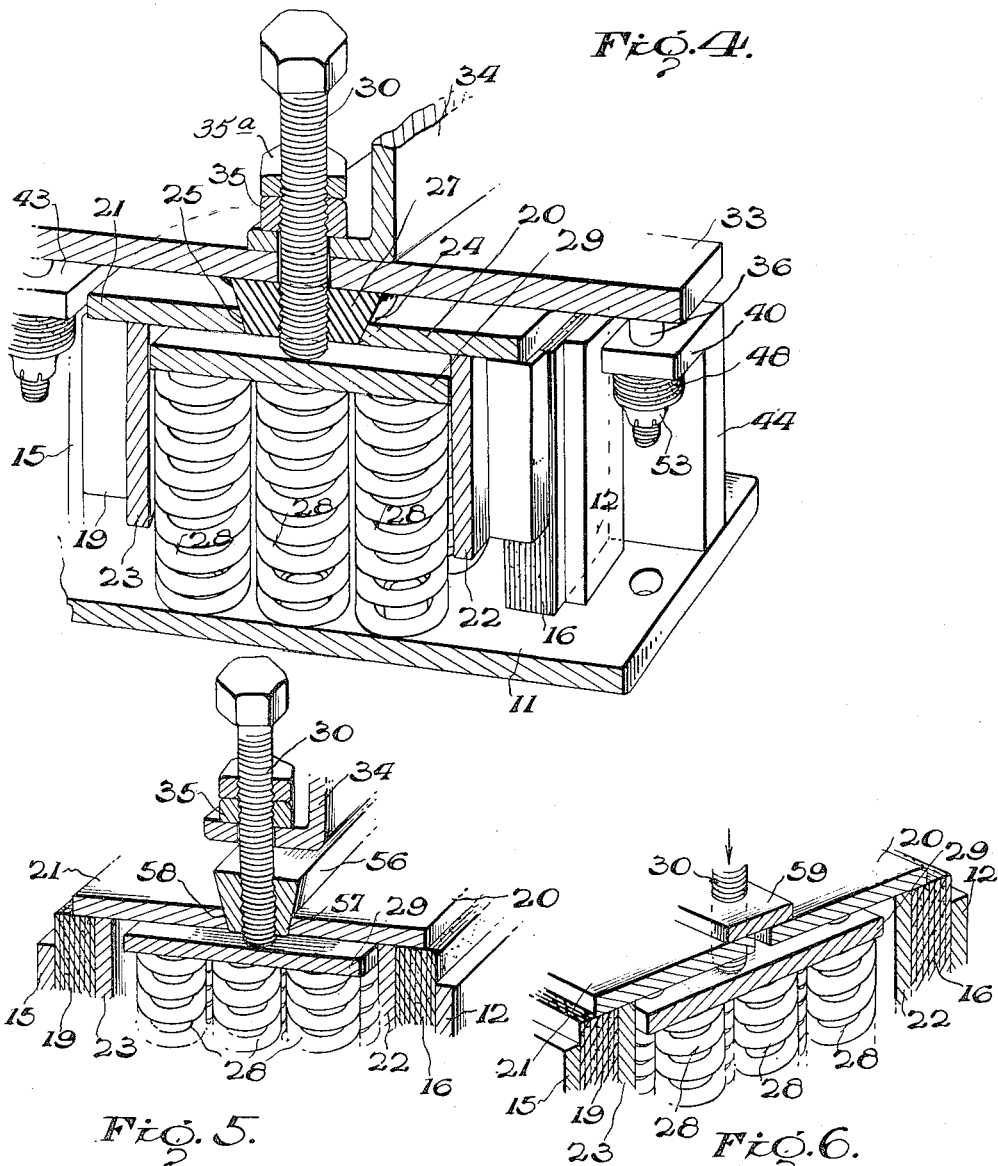
INVENTOR
Siegfried Rosenzweig.
BY 
ATTORNEY

United States Patent Office 2,697,571
Patented Dec. 21, 1954

2,697,571

COMBINATION VIBRATION ISOLATOR AND SNUBBER

Siegfried Rosenzweig, Long Island City, N. Y.

Application August 22, 1951, Serial No. 243,074

2 Claims. (Cl. 248—21)

This invention relates to vibration isolators and is more particularly concerned with isolators containing snubber means for controlling and damping the movements of machines, equipment and other devices on fixed supports.

The object of the invention is the provision of vibration isolators in combination with snubber means which is particularly suitable for use in supporting heavy machinery on a foundation and which is effective in damping vibration both from the foundation to the machinery and from the machinery to the foundation.

Another object of the invention is to provide a device of the type mentioned which is simple in construction, effective in operation and which can be fabricated of simple structural elements.

A further object is a vibration isolator having means for resiliently supporting a static load and means in combination therewith for snubbing intermittent forces acting thereon either in a vertical or a horizontal direction.

A still further object is the combination of a vibration isolator and a snubber comprising a base, means carried by the base for resiliently supporting a static load, said means including a member through which the force of the load is transmitted, an operator attached to the member for movement therewith, a pair of horizontal plates in side by side relation, vertical members attached to the plates, vertical abutments adjacent to the vertical members and resilient cushions between the abutments and the vertical members.

These and other objects and advantages of the invention will appear more fully from the following description considered together with the accompanying drawing.

In the drawing:

Figure 4 is a perspective view of a portion of the embodiment cut away along the line 4—4 of Figure 1.

Figure 5 is a partial vertical sectional view, in perspective, of a modified embodiment.

Figure 6 is a partial vertical view, in perspective, of a further embodiment of the invention.

Figure 1:
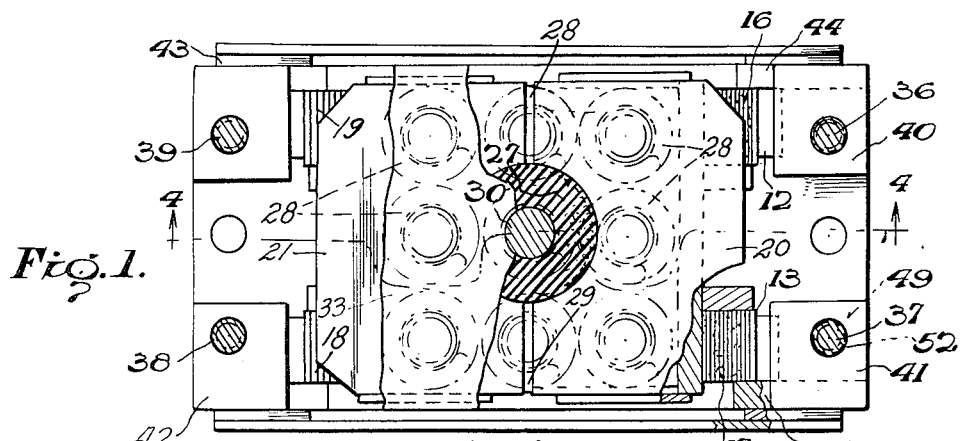
Figure 1 is a top plan view, partly in section, showing one embodiment of the invention.
Figure 2:
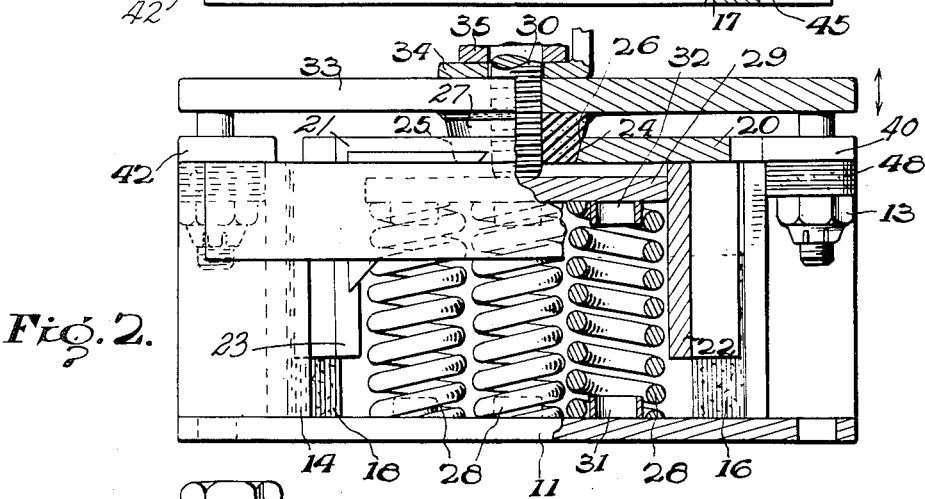
Figure 2 is a side elevational view, partly in section, of the same embodiment.
Figure 3:
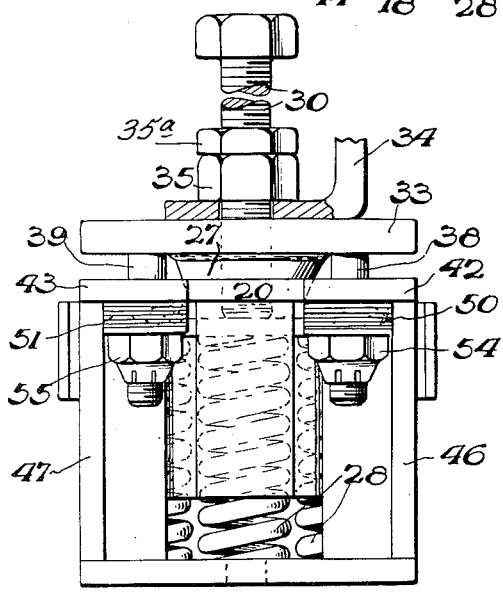
Figure 3 is an end elevational view of the same embodiment.

Referring with more particularity to the drawing in which like numerals designate like parts the embodiment illustrated in Figures 1, 2, 3 and 4 comprises a base member 11 adapted to rest on a horizontal foundation or support, such as a floor or deck. Rigidly secured to the sides of the base member 11, are vertical uprights or abutments 12, 13, 14 and 15. Against the inner sides of said abutments there are disposed cushions or blocks 16, 17, 18 and 19, one for each of the abutments, of a resilient material having inherent damping properties, such as rubber.

The blocks 16 and 17 on one side carry a horizontal plate 20 and the blocks 18 and 19 on the other side carry a corresponding plate 21. The outer edges of said plates rest on the top of their corresponding resilient blocks substantially as shown. Integral with the plates 20 and 21 are vertical legs 22 and 23, respectively, which normally bear against the inner sides of the blocks 16 and 17 on one side and blocks 18 and 19 on the other, respectively. The inner edges of the plates 20 and 21 have circular beveled portions 24, 25, respectively, which are adapted to cooperatively seat and carry the tapered lower section 26 of a circular plunger 27. Downward movement of the plunger causes the plates 20 and 21 to spread apart and increase the compression of the resilient blocks 16, 17, 18 and 19 through the abutting vertical legs 22 and 23.

The plunger 27 is resiliently supported by vertical coil springs 28 mounted between the base member 11 and a pressure plate 29 just under plates 20 and 21. Adjustable contact between the plunger and the pressure plate is effected by means of a vertical adjusting bolt 30 which is threadedly engaged with and which passes downwardly through the plunger 27 to rest on the pressure plate 29.

The ends of the coil springs 28 are prevented from moving laterally relative to the base 11 and pressure plate 29 by means of short thimbles 31 and 32 projecting from the base and pressure plate, respectively, into the respective open ends of the springs.

The top of the plunger 27 carries a mounting plate 33 to support a leg 34 or other machinery part to be mounted. A nut 35 for the bolt 30 is also provided to engage the top of the member 34 and hold the bolt in any desired dposition of adjustment. An additional locking nut 35a may also be provided.

Lateral support for the mounting plate 33 is provided by bolts 36, 37, 38 and 39 projecting downwardly through corresponding apertures in horizontal lugs 40, 41, 42 and 43, said lugs being attached to vertical supports 44, 45, 46 and 47, respectively. The lower ends of these bolts carry resilient washers 48, 49, 50 and 51 and holding nuts 52, 53, 54 and 55, respectively.

In use, the weight of the machinery or other mounted unit causes the mounting plate 33 and plunger 27 to move downwardly against the resilient action of the springs 28. This causes the horizontal plate members 20 and 21 to spread apart relative to each other. The position of the bolt 30 is adjusted so that the springs are deflected sufficiently to carry all or any portion of the weight of the machine desired, the balance being resisted by the snubbing action of the resilient blocks 16, 17, 18 and 19. It may be seen, therefore, that by adjusting the bolt 30, the static load can be apportioned between the springs and the resilient block to any extent desired, thereby permitting a selection of any desired initial snubber resistance to downward movement depending upon the prevailing conditions established by the adjustment of the bolt. Normally, however, the bolt 30 should be adjusted so that the static load is carried substantially entirely by the springs, the resilient blocks being used only for the purpose of controlling the movement. In order for the device to function as an isolator unit with maximum efficiency, it is necessary to reduce friction in the mounting to a minimum. The resilient blocks should come into play only when required to control or reduce the movement of the isolated machine. Adjustment of the bolt 30 to permit the resilient blocks to carry a portion of the static load is to be regarded in most cases as a more or less emergency or temporary measure where the springs are too weak to carry the load alone in which circumstance, it will usually be desirable to replace the weak springs with higher capacity springs that can carry the load and permit the device to function with maximum efficiency.

After the desired initial snubber resistance is set, any downward movement of the isolated machine will automatically cause an increase in snubber resistance or braking force. If the machine movement during operation is slight after the snubbers are initially adjusted, no increase in the braking force is necessary. This is the ideal condition, the load being carried by the springs and friction being kept to a minimum. However, should conditions arise to cause an increased movement in the machine, the braking force exerted by the snubbers will automatically increase and offer greater resistance to the increased movement.

Under a constantly repeating impact machine, for example, such as a high speed punch press, it is recommended that the bolt 30 be adjusted so that the coil springs 28 carry the full static load with the tapered portion 26 of the plunger just contacting the beveled portions 24 and 25 with only slight compression of the resilient blocks 16, 17, 18 and 19. The snubber action will result in the exertion of a braking force against downward movement of the machine leg. In any case where the adjustment of the bolt 30 is found to result in a greater movement of the machine than is desired, it can be readjusted to increase the pressure of the vertical legs 22 and 23 against the resilient blocks and vice versa.

The device also has the advantage that it will cushion horizontal forces because such a force transmitted to the plunger will exert a sideway pressure against the resilient blocks, independently of the coil springs.

The modified embodiment illustrated in Figure 5 is in all essential respects the same as that shown in Figures 1, 2, 3 and 4, except that there is substituted for the circular plunger 28, a wedge-shaped or trapezoidal plunger 56. To fit the straight sides of the modified plunger, the inner edges 57 and 58 of the plates 20 and 21, respectively, are correspondingly tapered along straight lines rather than circular.

The modified embodiment of Figure 6 is similar to those previously described, except that the tapered plunger and beveling of the plates are eliminated. Instead, there is provided a pressure strip 59 which bridges the inner ends of the plates 20 and 21 and rests thereon. Since the outer ends of the plates 20 and 21 are supported on the resilient blocks, downward pressure on the strip 59 through the mounting bolt 30 causes a downward tipping of the plates 20 and 21 at their inner ends with the result that the legs 22 and 23 are tipped against the resilient blocks causing a compression thereof and, hence, a snubbing action.

I claim:

1. A combined vibration isolator and snubber comprising a horizontal base, coil springs supported on said base, a pressure plate on said coil springs, a pair of horizontal plates in side by side relation to each other above said pressure plate, a plunger between said horizontal plates in contact with the inner edges thereof, said plunger and edges having complementary beveled surfaces to cause the horizontal plates to spread apart when the plunger moves downwardly relative thereto, vertical members attached to said horizontal plates, vertical abutments attached to the base adjacent said vertical members, resilient cushions between said vertical abutments and vertical members, said cushions extending vertically between and being in contact with the bottom of said plates and said base, a machinery mounting plate above said plunger, a vertical bolt slidably disposed through said mounting plate and threadedly engaged with said plunger, said bolt having its lower end resting on said pressure plate and its upper end extending above said mounting plate.

2. A device as defined by claim 1 having means for preventing lateral displacement of the mounting plate relative to the base.

References Cited in the file of this patent

UNITED STATES PATENTS

| Number | Name | Date |
|---|---|---|
| 2,116,042 | Rosenzweig | May 3, 1938 |
| 2,359,000 | Rosenzweig | Sept. 26, 1944 |
| 2,439,843 | Dath | Apr. 20, 1948 |
| 2,460,292 | Ivanovic | Feb. 1, 1949 |
| 2,466,480 | Rosenzweig | Apr. 5, 1949 |